(12) United States Patent
Nelson (10) Patent No.: US 12,281,954 B1
(45) Date of Patent: Apr. 22, 2025

(54) TESTING APPARATUS FOR MEASURING A GOLF HIT

(71) Applicant: Bill Nelson, Deer Park, NY (US)

(72) Inventor: Victor Nelson, Deer Park, NY (US)

(*) Notice: Subject to any disclaimer, the term of this patent is extended or adjusted under 35 U.S.C. 154(b) by 155 days.

(21) Appl. No.: 17/878,662

(22) Filed: Aug. 1, 2022

Related U.S. Application Data (60) Provisional application No. 63/228,263, filed on Aug. 2, 2021.

(51) Int. Cl.
| | |
|---|---|
| G01L 5/00 | (2006.01) |
| A63B 69/00 | (2006.01) |
| A63B 69/36 | (2006.01) |
| A63B 71/06 | (2006.01) |
| G01L 1/22 | (2006.01) |
| G01P 15/00 | (2006.01) |

(52) U.S. Cl.
CPC ........ *G01L 5/0052* (2013.01); *A63B 69/0091* (2013.01); *A63B 69/3658* (2013.01); *A63B 71/0622* (2013.01); *G01L 1/22* (2013.01); *G01P 15/003* (2013.01); *A63B 2209/08* (2013.01); *A63B 2214/00* (2020.08); *A63B 2220/34* (2013.01); *A63B 2220/40* (2013.01); *A63B 2220/53* (2013.01)

(58) Field of Classification Search
None
See application file for complete search history.

(56) References Cited

U.S. PATENT DOCUMENTS

| | | | |
|---|---|---|---|
| 3,182,508 A | 5/1965 | Varju | |
| 4,429,880 A * | 2/1984 | Chen | A63B 69/0091 473/141 |
| 4,609,197 A | 9/1986 | Vodin | |
| 4,971,326 A | 11/1990 | Montone | |
| 7,462,108 B2 * | 12/2008 | O'Mahony | A63B 24/0021 473/149 |
| 7,691,003 B2 * | 4/2010 | Munshi | A63B 69/0091 473/409 |
| 9,968,839 B2 | 5/2018 | Davenport | |
| 2005/0288119 A1 | 12/2005 | Wang et al. | |
| 2006/0128489 A1 * | 6/2006 | Mooney | A63B 24/0021 473/146 |
| 2023/0201685 A1 * | 6/2023 | Holmes | A63B 69/002 473/575 |

FOREIGN PATENT DOCUMENTS

| | | | | |
|---|---|---|---|---|
| EP | 1172128 A1 * | 1/2002 | | A63B 24/0021 |
| EP | 2671617 A2 | 12/2013 | | |
| WO | WO 96/16706 A1 | 6/1996 | | |

* cited by examiner

*Primary Examiner* — Peter J Macchiarolo
*Assistant Examiner* — Jermaine L Jenkins
(74) *Attorney, Agent, or Firm* — Edwin D. Schindler (57) ABSTRACT

A testing apparatus for measuring a golf ball that has been hit includes a golf ball or an element that can be either rigidly connected to, or linked through, one degree of freedom pivoting around its axis to an arm, which when the golf ball is struck can pivot around an axis of rotation that can achieve a partial or full turn before hitting a mechanical stop. The golf hit testing device further includes apparatus for measuring force, acceleration and rotational velocity of the golf ball that has been hit.

8 Claims, 10 Drawing Sheets

TESTING APPARATUS FOR MEASURING A GOLF HIT

CROSS-REFERENCE TO RELATED APPLICATION

The inventor claims domestic priority, pursuant to 35 U.S.C. §119 (e), on the basis of U.S. Provisional Patent Application Ser. No. 63/228,263, filed Aug. 2, 2021, the entire disclosure of which shall be deemed to be incorporated by reference herein.

BACKGROUND OF THE INVENTION

Technical Field of the Invention

The present invention relates, generally, to a testing apparatus and, more particularly, the present invention relates to a testing apparatus for measuring a golf ball hit.

Description of the Prior Art

Sensors for measuring swing speed and focus on the swing club itself, which is not enough to consider the sweet spot where the ball meets the club during impact. These products also necessitate that the golfer trains in a golf course hitting a golf ball during practice.

Other golf products use training bags with a bulls-eye sign in the middle, but fail to quantify the impact force and replicate the real-life scenario as the bag geometry and dynamics are completely different than an actual golf ball.

Other special golf clubs that are designed for training golfers exist, but again they focus on the club and fail to quantify the resulting impact force of the ball itself.

Numerous innovations for golf-related devices have been provided in the prior art, which will be described below in chronological order to show advancement in the art, and which are incorporated herein in their entirety by reference thereto. Even though these innovations may be suitable for the specific individual purposes to which they address, nevertheless, they differ from the embodiments of the present invention.

The prior art known to the invention and considered representative of the state of the art includes the following:

U.S. Pat. No. 3,182,508 to Varju

U.S. Pat. No. 3,182,508 teaches an apparatus for producing a signal current for measuring a golf drive. The apparatus includes a golf club having a head providing a striking face and a cavity disposed inwardly from the striking face, an elongate element adapted to be received in the cavity generally parallel to the face and having a side facing toward and a side facing away from the striking face, a support fixed to one end of the element and to the head to dispose the element inside the cavity with the length of the element approximately parallel to the striking face wherein the surfaces defining the cavity are spaced from the element to provide free elastic deflection thereof in response to impact forces normal to golf play sustained by the head, an electrical conductor carried by the element and extending in the lengthwise direction of the element and being attached to a one of the sides of the element, and an electrical circuit including a constant voltage energy source and at least a section of the conductor connected within the circuit at points of connection spaced along the conductor in the lengthwise direction of the element for generating a signal current in the circuit varying in accordance with the deflection of the element and the section toward the striking face.

U.S. Pat. No. 4,609,197 to Vodin

U.S. Pat. No. 4,609,197 teaches a golf practice device to permit golfers to practice their golf swings in a relative restricted area and to give them an indication, the power of their swings, by way of an impact measuring device attached and secured to the upper end of a rigid and hollow stake driven into the ground. A shock cord is attached at one end at the bottom of the stake and the other end is attached by appropriate apparatus to the golf ball mounted on the top of the stake. The measuring indicator includes a flat bar member having a central longitudinally extending slot in which is disposed a helical spring member having one of its ends secured to a plunger slidably moveable in the slot and the other end of the spring member being secured to the flat member. A cord has one end around extending through the helical member and secured to the plunger and the other end of the cord passes through a passage communicating with the interior of the stake thereby permitting the other end of the cord to be attached to the shock cord a predetermined distance below the mounted golf ball. The slot also slideably supports an indicator slide that is adapted to be moving by the plunger that will move the indicator slide a measured distance along the flat bar whenever the golf ball is struck by a gold club head.

U.S. Pat. No. 4,971,326 to Montone

U.S. Pat. No. 4,971,326 teaches an indoor-outdoor golf practice device for use with all golf club woods, irons, and wedges. A lightweight practice golf ball is attached with a selectable length cord to a single fold-over and flexible flap. The flap contains one or more small calibration weights at its opening end and covers distance-marker scales, with each scale corresponding to a particular range to be measured. The kinetic energy at a particular point in the flight trajectory of the well-hit, light-weight, and properly positioned practice ball, which simulates a roughly 250 yard drive is sufficient to fully open the fold-over flap with a 10 foot tether cord, thus exposing the high range full scale markers up to 250 yards. Similarly, the poorly hit practice ball contains less kinetic energy at the same selected point from the flap in its flight trajectory, and only partially opens the flap, which exposes lower yardage markers indicating a low quality drive for short iron and wedge strokes. A shorter effective length of tether cord is used to utilize an equivalent power point on shorter ball flight trajectories making possible multiscale operation with improvement in scale read-out resolution on low power ball flight trajectories.

U.S. Pat. No. 9,968,839 to Davenport

U.S. Pat. No. 9,968,839 teaches a golf club head that includes a club face with at least one impact sensor. The sensor has a passive piezoelectric element that is integrated into the club face. The passive piezoelectric element is able to generate a signal when an impact force is applied to the club face. An energy storage assembly includes a battery, a capacitor, or both. An energy harvesting assembly includes a signal divider with at least one input and at least two outputs. The at least two outputs provide a known ratio of a given input signal. The at least one input of the signal divider is electrically coupled to one or more of the piezoelectric elements and a first of the at least two signal divider outputs is electrically coupled to the energy storage assembly.

United States Patent Application Publication Number 2005/0288119 to Wang et al

U.S. Patent Application Publication No. 2005/0288119 A1 teaches a sporting apparatus used by a person for engaging in a sporting activity. The sporting apparatus includes a single or multiple embedded MR sensors for measuring magnetic vectors of the earth magnetic field for dynamically recording a path of motion of the sporting apparatus in real time. In a preferred embodiment, the sporting apparatus further includes one or multiple MEMS accelerometer sensors for sensing acceleration of a designated portion of the sporting apparatus for measuring impact velocity as the designated portion impacting a ball. In a specific embodiment, the sporting apparatus is a golf club wherein the accelerometer sensors are disposed adjacent to the grip side of the shaft for sensing the impact of the club head against a golf ball. In another specific embodiment, the golf club further includes a magnetic field sensor disposed near the grip end of the golf club for measuring a motion path of the golf club.

P.C.T. International Application Publication No. WO 96/16706 to Nashner

P.C.T. International Application Publication No. WO 96/16706 teaches a device for the assessment or biofeedback training of coordination skills of a subject critical to maximizing the power and accuracy of athletic ball-strike activities. The device includes a body movement sensor providing an output indicative of the motion of the subject's body over a period of time including the moment of ball strike, a ball-strike sensor, a display, and a computer in communication with the body movement sensor, the ball strike sensor, and the display to cause the display to show both a trajectory of the motion of the subject's body and the moment of ball strike in relation to a region of the trajectory.

European Patent Application Publication Number 2,671,617 A2 to Molinari

European Patent Application Publication No. 2,671,617 A2 teaches a golf ball with a piezoelectric material portion allowing golf ball data to be obtained when a golfer hits the golf ball with a golf club. An output from the piezoelectric material generated in response to the impact force of the golf club hitting the golf ball is measured. Based on the measured output, golf ball data can be obtained. The obtained golf ball data may be used by golf club fitting systems, golf ball fitting systems, and golfer profile databases.

It is apparent that numerous innovations for golf-related devices have been provided in the prior art, which are adapted to be used.

SUMMARY OF THE INVENTION

Thus, an object of the present invention is to provide a testing apparatus for measuring a golf hit, which avoids the disadvantages of the prior art.

Briefly stated, another object of the present invention is to provide a golf hit testing device of the present invention including a golf ball or element that can be either rigidly connected or linked through one degree of freedom (pivoting around its axis) to an arm, which when struck can pivot around an axis of rotation that can achieve a partial or full turn before hitting a mechanical stop. The golf hit testing device of the embodiments of the present invention also has apparatus for measuring force and/or acceleration and/or rotational velocity.

The foregoing and related objects are accomplished by the present invention, which provides a testing apparatus for measuring a golf ball hit when a golfer hits a golf ball, which includes a rotating arm, a golf ball affixed to one end of the rotating arm, a rotating shaft and stanchions for accommodating the rotating shaft with a rotating member being affixed to rotating arm opposite to golf ball and rotatable around shaft. Supporting rails are provided for supporting the stanchions and a damping structure is included to receive a golf ball that is hit by a player. Sensors measure the impact of the hit golf ball. A spring is included to return the hit golf ball to the pre-hit position and a magnet maintains the golf ball in its pre-hit position. Finally, means for measuring the force of the golf ball hit and means for measuring the rotational velocity of the golf ball are included.

The means included for measuring the force of the golf ball, preferably, includes an accelerator to measure the acceleration and forces of the golf swing and a signal/data read-out screen to visually display the data of the accelerator.

Similarly, the means for measuring the rotational velocity the golf ball, preferably, includes an accelerator to measure the acceleration and forces of the golf swing; and a signal/data read-out screen to visually display the data of the accelerator.

Other objects and features of the present invention will become apparent when considered in combination with the accompanying drawing figures, which illustrate certain preferred embodiment of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing figures, wherein similar features are denoted with similar reference numerals throughout the several views.

DESCRIPTION OF THE REFERENCED NUMERALS

The following numbering is used the various drawing figures:
- 10a first embodiment of present invention
- 10b second embodiment of present invention
- 12 golfer
- 12a golf club to impress a force on golf ball
- 14a golf ball in static pre-hit position
- 14b golf ball during travel
- 14c golf ball in post-hit destination position
- 14d golf ball
- 14e golf ball
- 16 ground
- 18a mounting rail
- 18b mounting rail
- 20a stanchion on mounting rail
- 20b stanchion on mounting rail
- 20c stanchion on mounting rail
- 20d stanchion on mounting rail
- 22a ground spike attached to mounting rail
- 22b ground spike attached to mounting rail
- 22c optional ground spike attached to mounting rail
- 22d optional ground spike attached to mounting rail
- 24 pivot point
- 24a pivot point
- 26 shaft
- 26a shaft
- 28a adjustment collet on shaft
- 28b adjustment collet on shaft
- 30 rotating arm
- 32 rotating member
- 34 rotation arc of rotating arm
- 36 magnetic latch to maintain golf ball pre-hit position
- 38a accelerator to measure the acceleration and forces of golf swing
- 38b encoder (optical or magnetic)
- 38c force gauge
- 38d resistive network
- 40 damper
- 42 spring
- 44 signal/data read-out screen
- 46 sensor
- 48 camera
- 50 frame
- 52 slot in frame
- 54 direction of hit

DETAILED DESCRIPTION OF THE PREFERRED EMBODIMENTS

The preferred embodiments of the present invention provide a golf hit testing device designed to test the impact force of a golf club when it launches a golf ball. The golf hit testing device of the embodiments of the present invention will not only allow measuring how strong the swing is, but more importantly allow the golfer to optimize for his/her best grip, best club to use, and best posture that can maximize the force of that shot and presently there are no available systems or devices for this purpose.

As shown in FIGS. 1, 2, 3, 4, 5 and 6 the golf hit testing device of embodiment 10a of the present invention comprises golf ball 14a or element that can be either rigidly connected or linked through one degree of freedom (pivoting around its axis) to arm 30 which when struck by golfer 12 using gold club 12a pivots on shaft 26 at pivot point 24 and rotates on said shaft 26 in the arc 34 to achieve a partial or full turn before hitting a mechanical stop, damper 40. Golf ball 14b is illustrated partially rotated and when the rotation is concluded golf ball 14c is in contact with damper 40. The components of the golf hit testing device are affixed to mounting rails 18a and 18b which are imbedded in ground 16 by ground spikes 22a, 22b, 22c, 22d. (either 22a and 22b or 22c and 22d are used at one time). Stanchion 20a is attached to rail 18a and stanchion 20b is affixed to rail 18b and stanchions 20c and 20c are optional. Adjustable collets 28a and 28b are positioned on shaft 26 for adjustment by user. Golf ball 14a, 14b and 14c are shown in their various positions.

The golf hit testing device of the present invention also has apparatus for measuring force and/or acceleration and/or rotational velocity and signal/data read-out screen 44 is provided. Camera 48 (not shown) may also visually record the movement. Typical sensors used to accomplish these measurements are namely:

(a) accelerometer 38a for measuring acceleration and ultimately the forces of the golf swing;

(b) encoder 38b (optical or magnetic) around the rotation shaft of the arm of the golf hit testing device of the embodiments of the present invention can be used to measure the rotational velocity and can be integrated to calculate acceleration;

(c) force gauge 38c at the stop of the golf hit testing device of the present invention will also allow measuring the force of impact; and, (d) resistive network 38d of the golf hit testing device of the present invention to show change of voltage due to impact.

Figure 6:
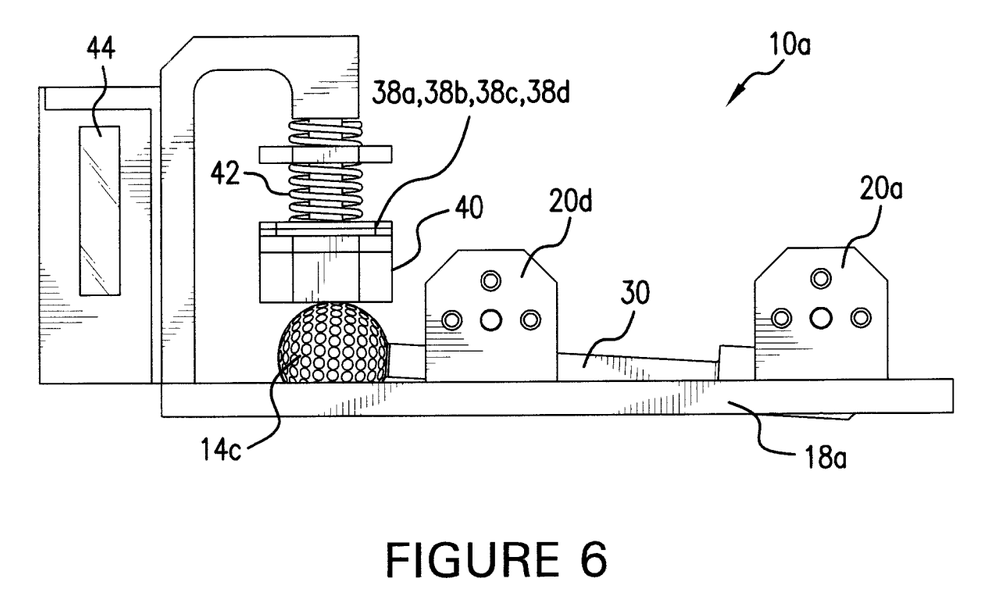
FIG. 6 is a side view of the testing apparatus of the present invention showing the golf ball thereof on impact with the mechanism thereof that measures the force and dissipates the energy.
Figure 7:
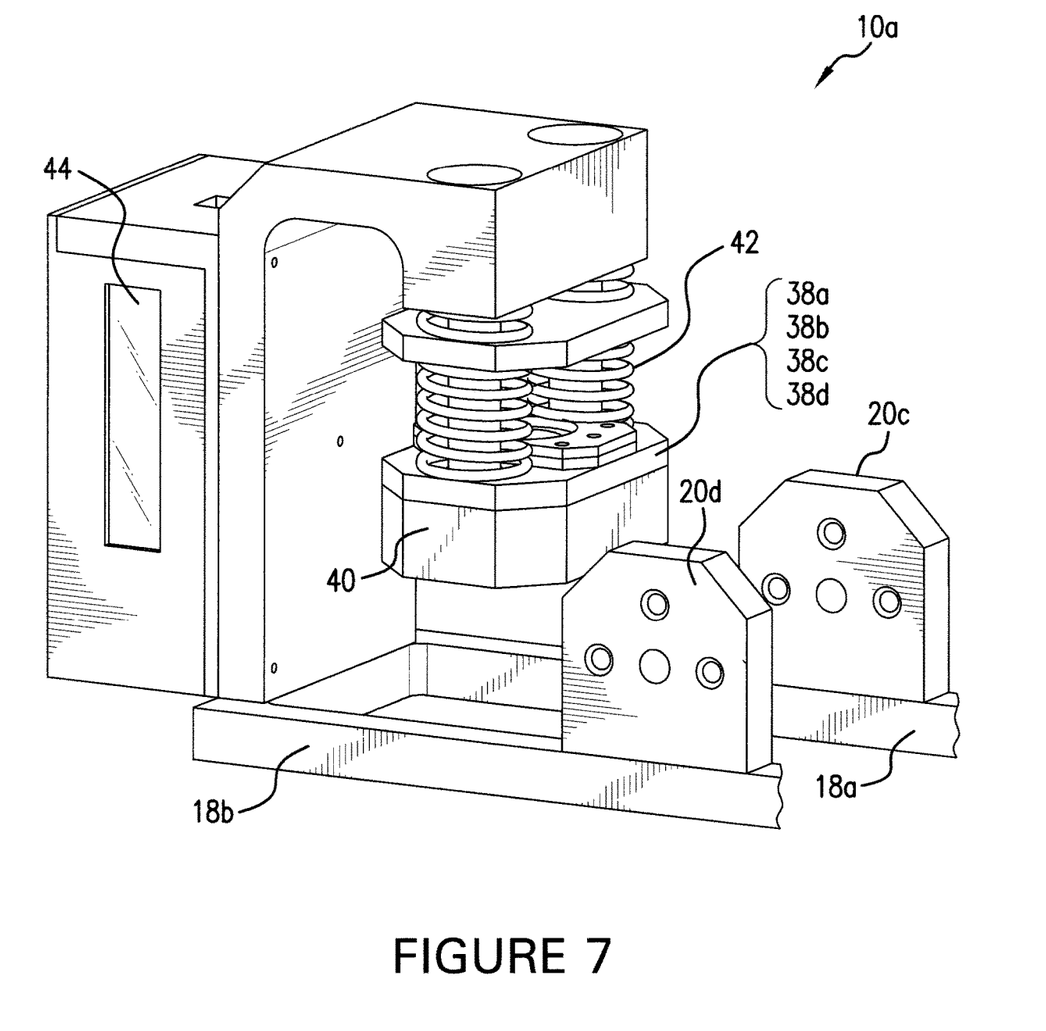
FIG. 7 is an enlarged diagrammatic perspective view of the sensor of the testing apparatus of the present invention.
Figure 8A:
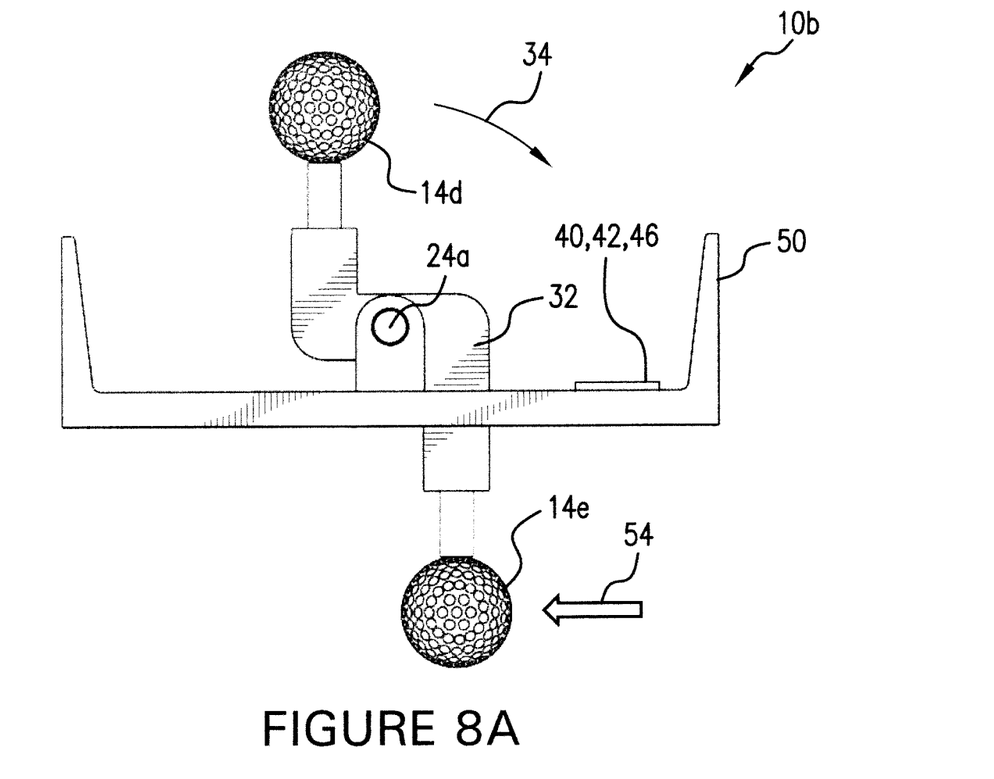
FIG. 8A is a side view of a second embodiment of the invention prior to contact with the golf ball.
Figure 8B:
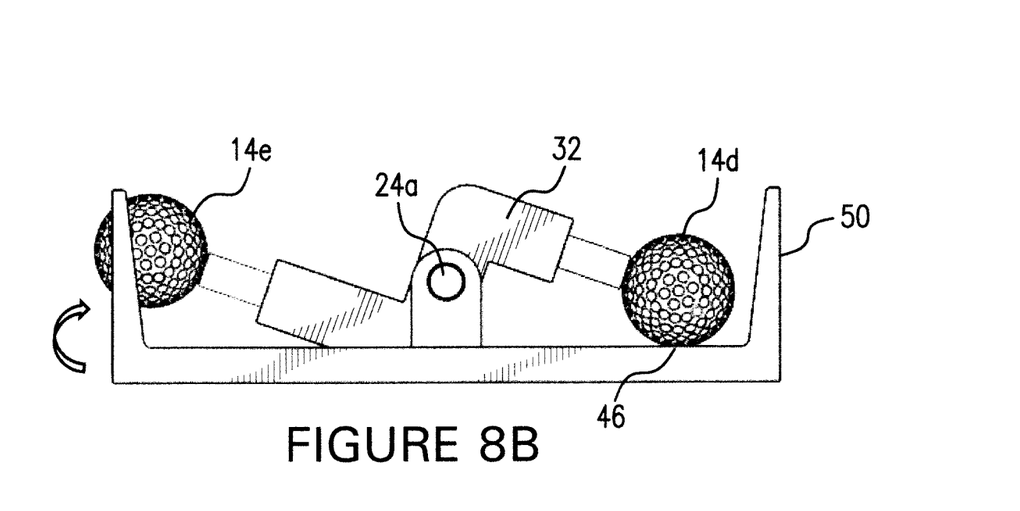
FIG. 8b is a side view of the second embodiment of the invention after contact with the golf ball.
Figure 9A:
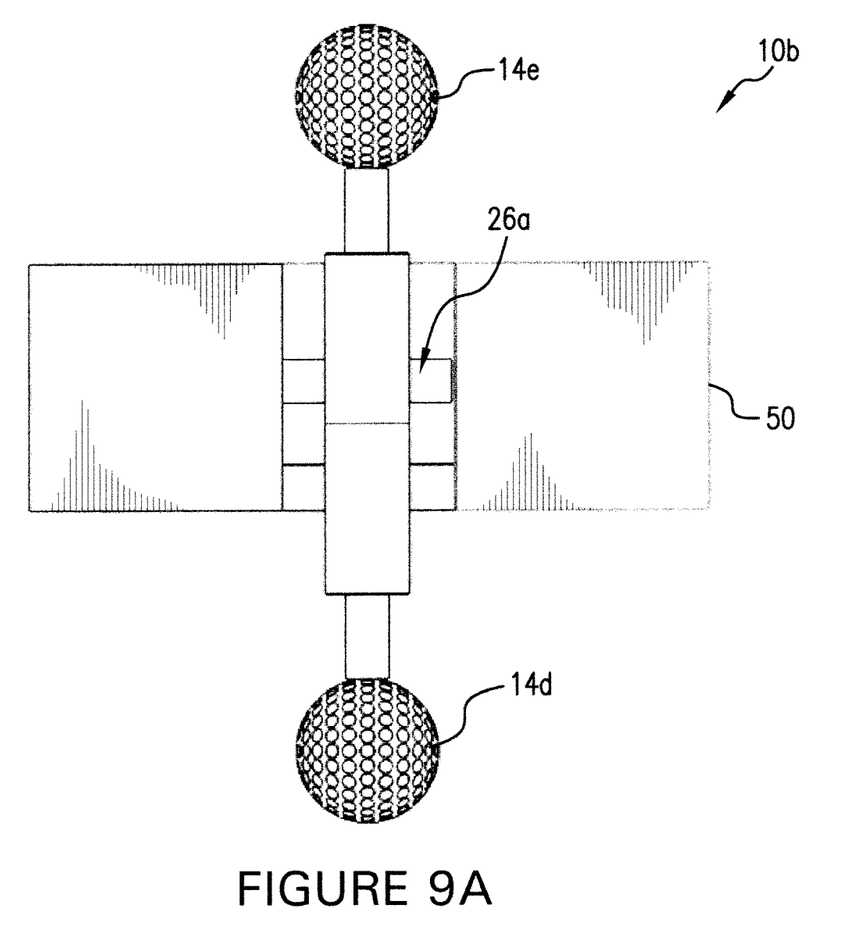
FIG. 9A is a top view of the second embodiment of the invention prior to contact with the golf ball.
Figure 9B:
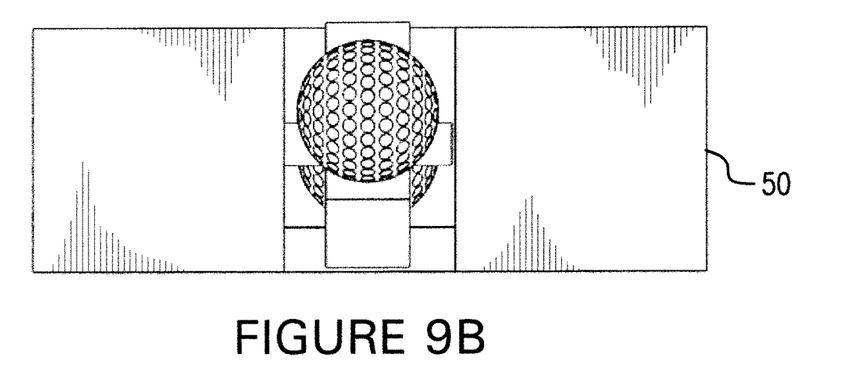
FIG. 9b is a top view of the second embodiment of the invention after contact with the golf ball.
Figure 10A:
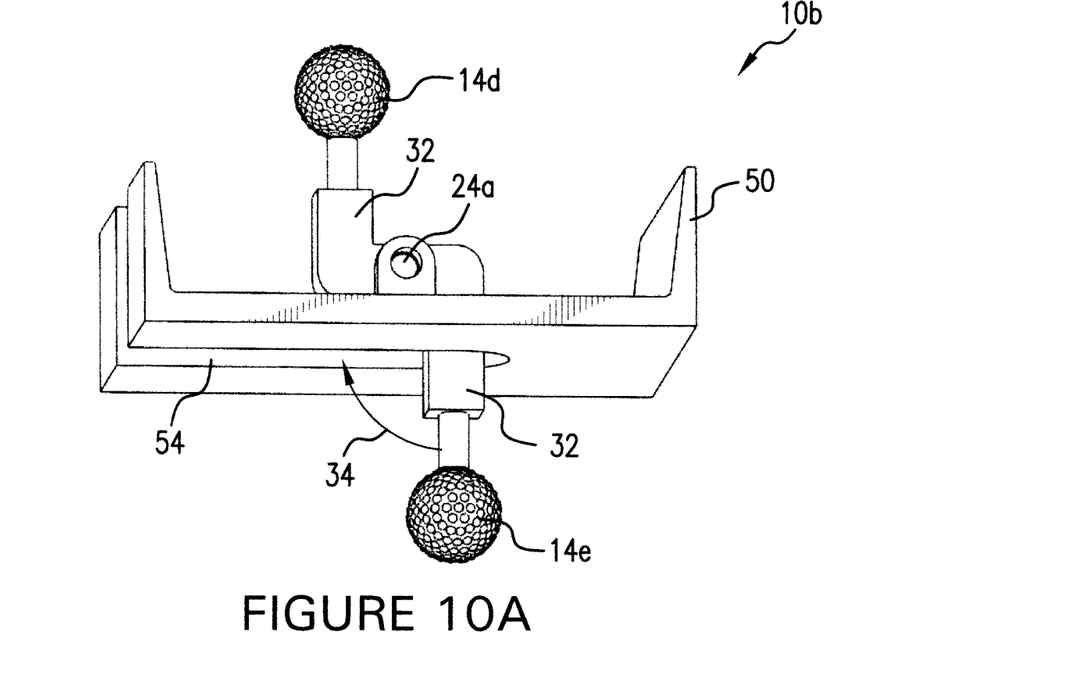
FIG. 10A is a perspective view of the second embodiment of the invention prior to contact with the golf ball; and, FIG. 10B is a perspective view of the second embodiment of the invention after contact with the golf ball illustrating the slot thereof on the left where the ball thereof moves past the wall thereof.
Figure 10B:
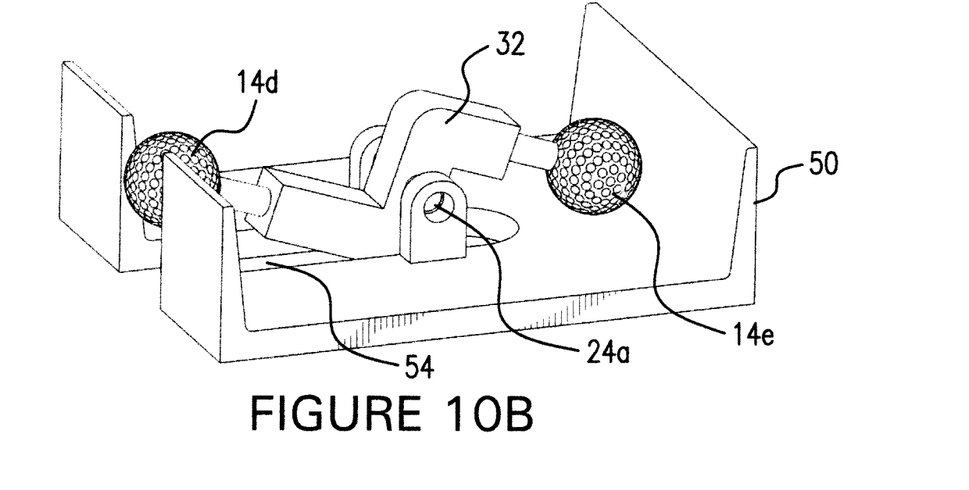

FIG. 6 illustrates stanchion 20a and optional stanchion 20d, both affixed to rail 18a. Golf ball 14c is in contact with damper 40 which in turn transmits the impact of golf ball 14c to spring 42 and then to accelerator 38a, encoder 38b, force gauge 38c and/or resistive network 38d. FIG. 7 is a partially enlarged view of embodiment 10a further illustrating some of the essential elements of embodiment 10a.

The golf hit testing device of the embodiments 10a and 10b of the present invention have a damping module STOP 40 to absorb and dissipate the kinetic energy of the golf ball after impact. The damping module can be mounted (fixed or attached) on the left side or right side based on the golfers, if they are right-handed or left-handed.

Rotating arm 30 of the golf hit testing device of the present invention should move more than 90° to clear the swing of the club and not get stuck midway to prevent impact injuries to the golfer. Accordingly. struck golf ball 14a ball moves away and hide under the horizontal plane after impact as in FIG. 6. The moving components should have some stiffness (such as, an internal spring or spring like) to dissipate the impact force component that is in the same direction as the arm 30 itself to reduce the stress on the golf ball and prevent separated from the arm.

The golf hit testing device of invention 10a contains rotating arm 30 moving on a plane parallel to the ground of floor or may have the arm moving in the vertical plane instead. The advantage of the first option is that it does not need to be placed vertically to guarantee a specific preset height of the ball relative to the floor.

Golf hit testing device of the embodiments of the present invention allows golfers to train at home, optimize their swings, and replicate the real-life motion of the golf ball during impact. One can also adjust the height of the target ball to make use of different golf clubs. In another embodiment, the golf hit testing device of the embodiments of the present invention has the same rotating arm with or without the spinning axis, but no sensors onboard. For this scenario, a camera with a computer vision algorithm can track the initial impact frames and quantify speed by placing the camera at specific locations relative to the device.

Since the golf ball geometry is constant, the software can track the ball of the golf hit testing device of the embodiments of the present invention and quantify its speed. A mobile app with a camera phone would be an easy way to perform this function. A mobile app is also one possible way to show the results from the sensors in the other embodiments. Displaying the results on an on-board LCD display or separate PC is also viable option to show the measured and calculated values of impact force, speed, and acceleration.

Figure 1:
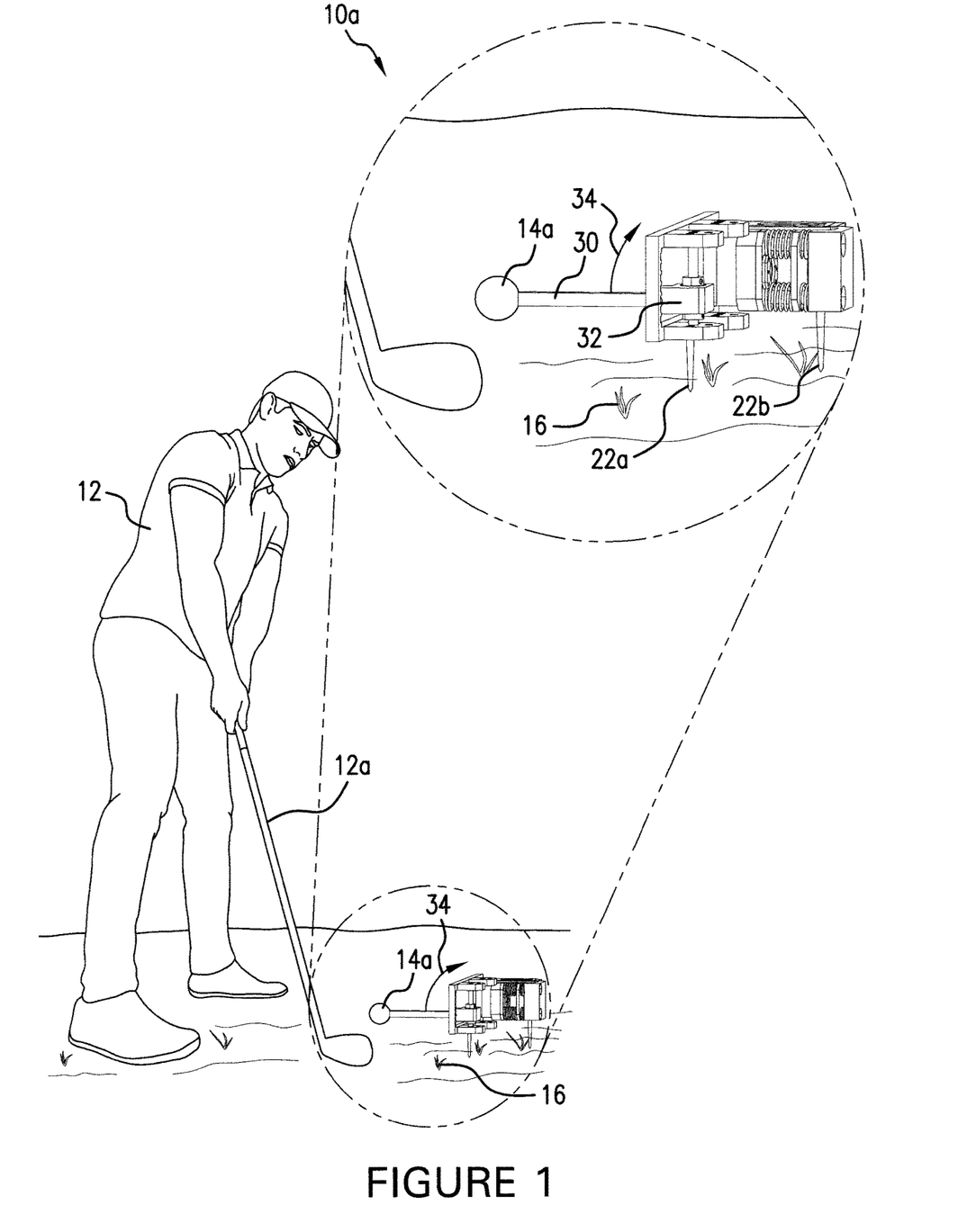
FIG. 1 is a perspective view of the testing apparatus of the present invention positioned on the ground with pikes and prior to impact.
Figure 2:
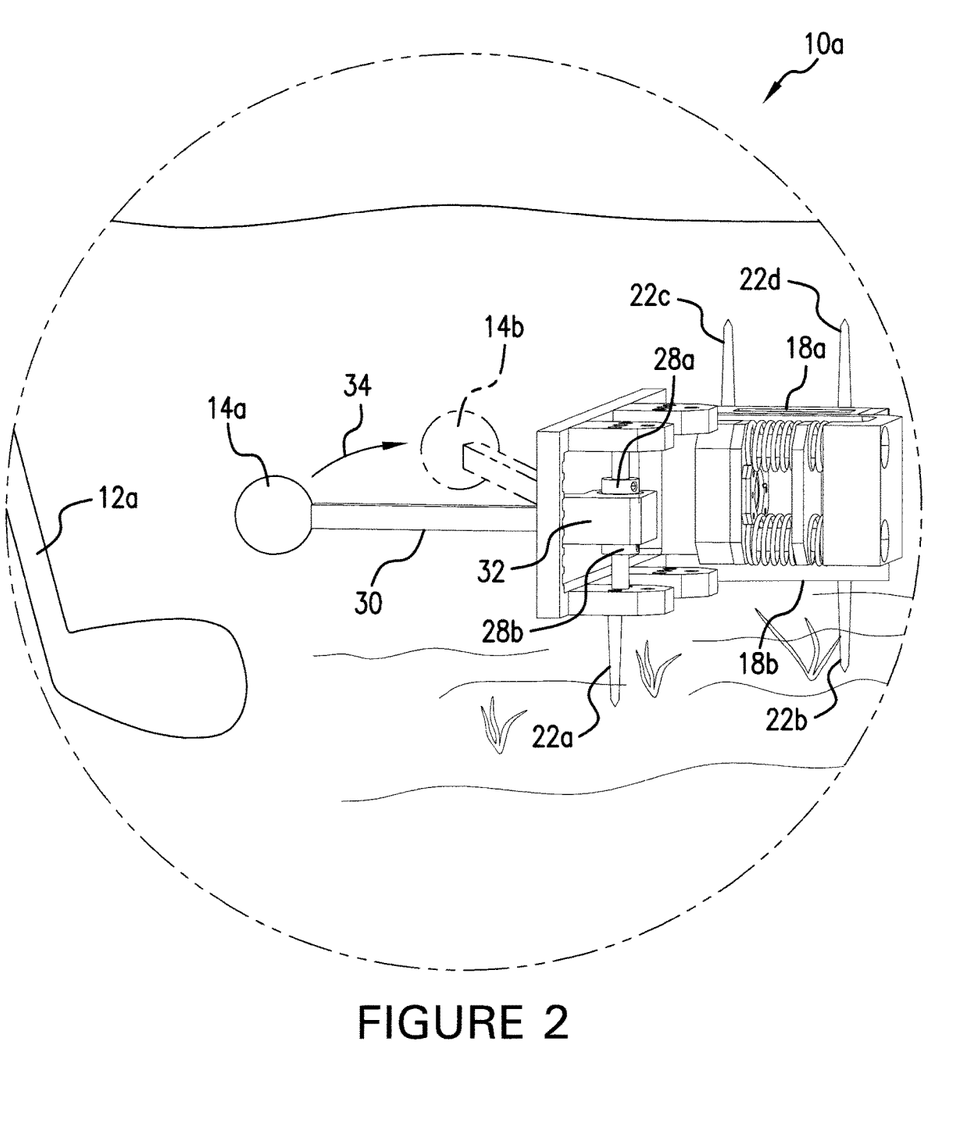
FIG. 2 is a side view of the testing apparatus of the present invention.
Figure 3:
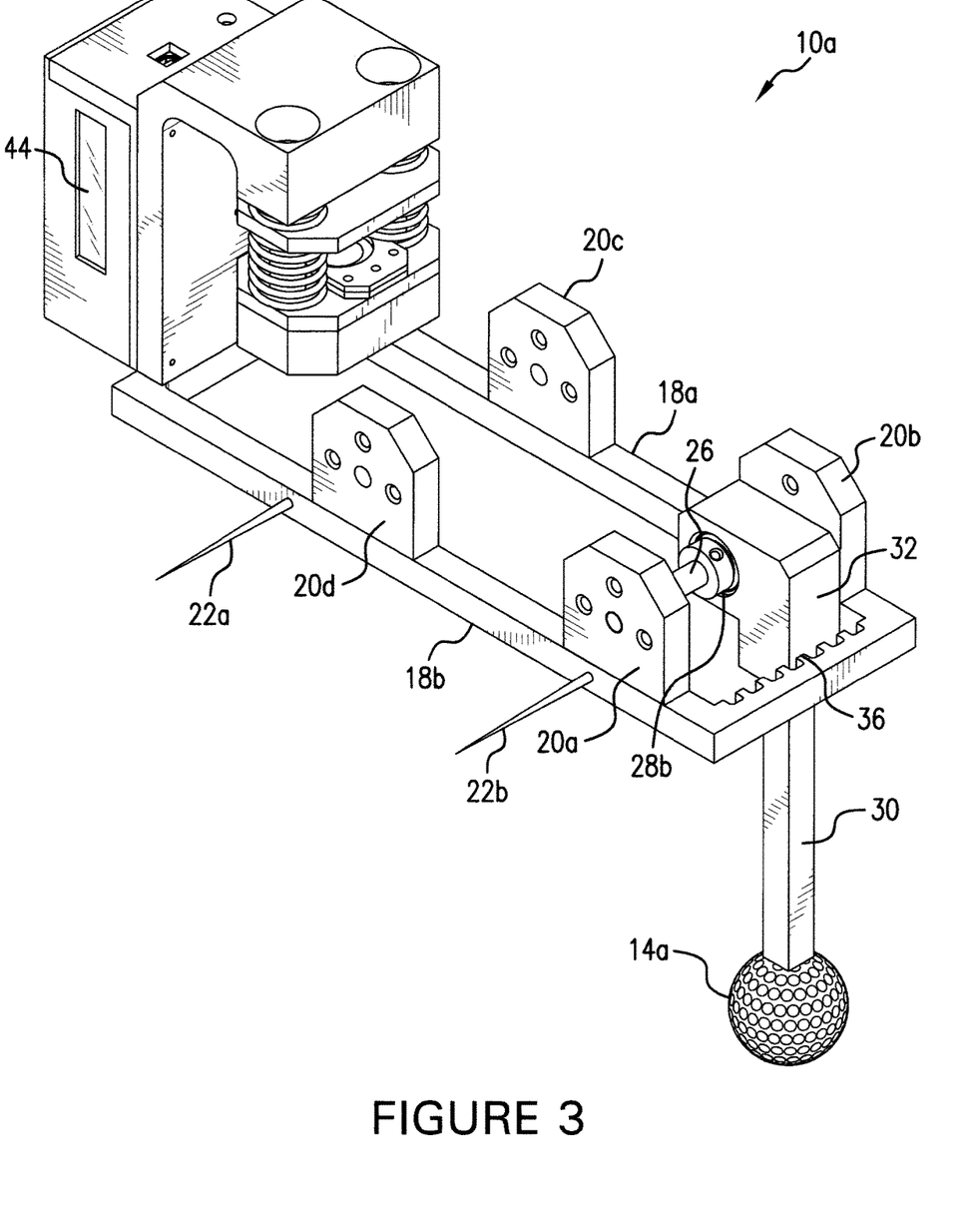
FIG. 3 is an enlarged diagrammatic perspective view of the sensor of the testing apparatus of the present invention.
Figure 4:
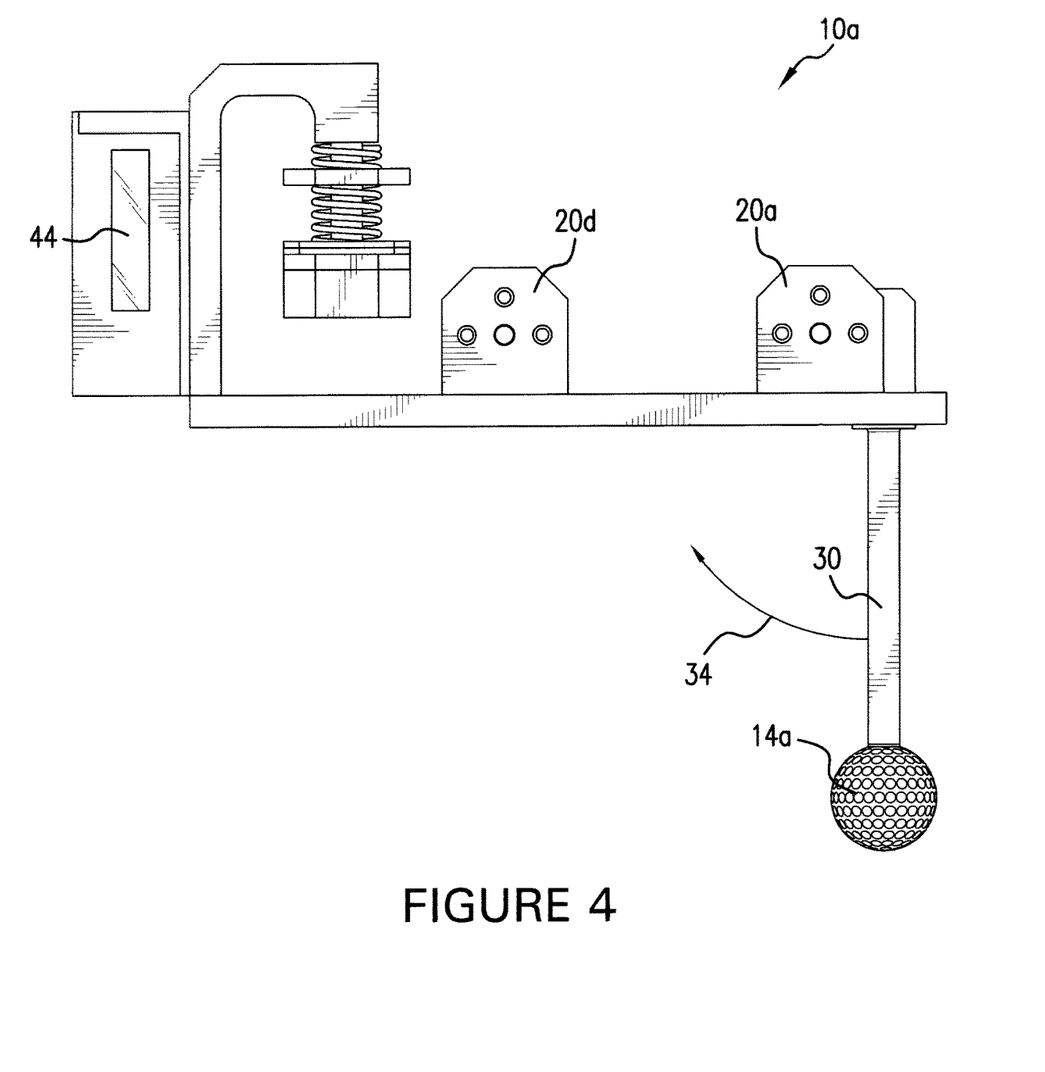
FIG. 4 is a side view of the testing apparatus of the present invention prior to use.
Figure 5:
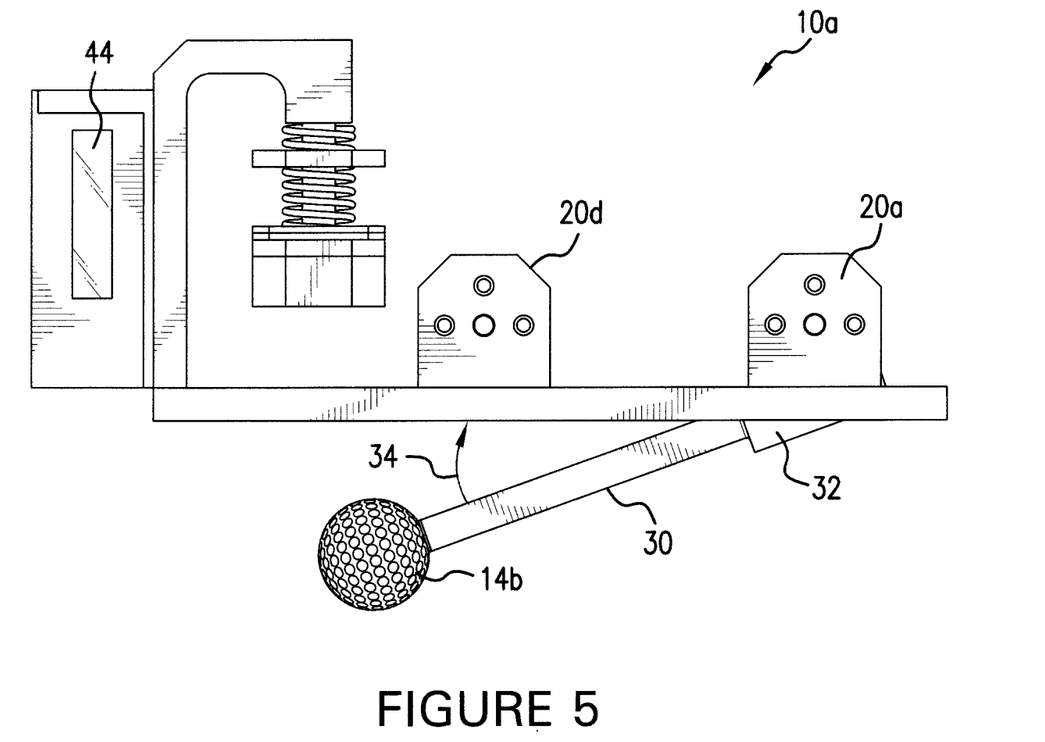
FIG. 5 is a side view of the testing apparatus of the present invention with the golf ball in motion.

In the preferred embodiment 10a shown in FIGS. 1, 2, 3, 4 and 5, arm 30 rotates after hitting the golf ball and contacts the mechanism to absorb the impact. FIG. 7 illustrates the position of spring 42 and rubber dampener 40 that dissipate the kinetic energy of the ball. As shown in FIG. 3, after golf ball 14a bounces back arm 30 returns to the start position with the force of spring 42 and magnetic latching mechanism 36 maintains arm 30 in a start position. Two typical concepts of measuring the impact force are:

1. a strain gauge similar to a load cell; and,
2. a piezoelectric sensor that detect vibration and reports the value of its amplitude.

A signal is processed by a microcontroller on board and displayed on a digital screen 44 that prompt the user of when the golf hit testing device of the embodiments of the present invention is ready for another hit. In one embodiment, the microcontroller will display meaningful results to the user, such as, simulated yards per hit instead of just a score. The values displayed are corresponding to the magnitude of the impact force. The device can be flipped on its side to accommodate for left-handed and right-handed players. As shown in the various figures the display of the present invention could have two screens 44 to display the results or one screen with the ability to rotate the display enclosure, so that the display screen is facing upward for the golfer to see the readout results.

As shown in FIGS. 8a, 8b, 9a, 9b, 10a and 10b in the second preferred embodiment 10b, the arm of the golf hit testing device of the embodiments of the present invention can be mounted to freely slide up and down to adjust for the height of the golf ball when it could be as low as sitting on the grass and as high as a full length of a golf tee. Golf balls 14e and 14d are shown prior and after being contacted by golf club 12a. Rotating arm 32 rotates on shaft 26a at pivot point 24a of the golf hit testing device of the embodiments of the present invention can be spring loaded with a sensor to measure the upward force component after impact and it can be used to dissipate the kinetic energy in the vertical direction. Rubber dampeners can be used there as well to further dampen that vertical force. The direction of hit 54 on golf ball 14 moves golf ball 14d to contact damper 40 spring 42 and sensor 46. Frame 50 provides support for rotating member 32b and slot 52 provides clearance for golf ball 14e.

In order to emulate and swirl the golf ball, it is possible to allow the golf ball to have an additional degree of freedom and use an encoder to measure its rotational speed. A torsional spring can be used to absorb the kinetic energy of the swirl.

In a further embodiment the golf hit testing device of the embodiments of the present invention could have an audio feedback to show the measured impact force. Colored LEDs are another way of displaying the results with or without the LCD displays.

Finally, the golf hit testing device of the embodiments of the present invention can also be used for various sports, such as, boxing, baseball, and tennis to measure and adjust one's swing impact force.

Each of the elements described above or two or more together may also find a useful application in other types of constructions differing from the types described above. While the embodiments of the present invention have been illustrated and described as embodied in a testing apparatus for measuring a golf hit, nevertheless, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

What is claimed is:

1. A testing apparatus for measuring a golf ball hit when a golfer hits a golf ball, comprising:
    a rotating arm with a golf ball affixable to an end of said rotating arm for placing the golf ball in a pre-hit position;
    a shaft;
    stanchions for accommodating said shaft;
    rotating member affixed to said rotating arm opposite the golf ball and rotatable around shaft;
    supporting rails for supporting said stanchions;
    a damper for receiving the golf ball after the golf ball is hit;
    a sensor for measuring an impact of the golf ball being hit;
    biasing means for returning the golf ball hit to the pre-hit position;
    means for measuring force of the golf ball being hit; and,
    means for measuring rotational velocity of the golf ball being hit.

2. The testing apparatus for measuring a golf ball hit when a golfer hits a golf ball according to claim 1, further comprising a magnet for maintaining the golf ball in the pre-hit position.

3. The testing apparatus for measuring a golf ball hit when a golfer hits a golf ball according to claim 1, wherein said means for measuring force of the golf ball being hit include an accelerator for measuring acceleration and force of a golfer's golf swing and a signal/data read-out screen for visually displaying data of said accelerator.

4. The testing apparatus for measuring a golf ball hit when a golfer hits a golf ball according to claim 1, wherein said means for measuring the rotational velocity of the golf ball being hit include an accelerator for measuring acceleration and force of a golfer's golf swing and a signal/data read-out screen for visually displaying data of said accelerator.

5. The testing apparatus for measuring a golf ball hit when a golfer hits a golf ball according to claim 1, wherein said sensor for measuring an impact of the golf ball being hit includes an accelerator.

6. The testing apparatus for measuring a golf ball hit when a golfer hits a golf ball according to claim 1, wherein said sensor for measuring an impact of the golf ball being hit includes an encoder.

7. The testing apparatus for measuring a golf ball hit when a golfer hits a golf ball according to claim 1, wherein said sensor for measuring an impact of the golf ball being hit includes a force gauge.

8. The testing apparatus for measuring a golf ball hit when a golfer hits a golf ball according to claim 1, wherein said sensor for measuring an impact of the golf ball being hit includes a resistive network.

\* \* \* \* \*